United States Patent
Dufresne du Virel (10) Patent No.: US 8,149,481 B2
(45) Date of Patent: Apr. 3, 2012

(54) SCANNER THAT SCANS TO FILM (75) Inventor: Francois Dufresne du Virel, Paris (FR)

(73) Assignee: Sagem Scurite, Paris (FR)

( * ) Notice: Subject to any disclaimer, the term of this patent is extended or adjusted under 35 U.S.C. 154(b) by 1136 days.

(21) Appl. No.: 11/906,834

(22) Filed: Oct. 4, 2007

(65) Prior Publication Data

US 2008/0088890 A1 Apr. 17, 2008

(30) Foreign Application Priority Data

Oct. 4, 2006 (FR) ................................. 06 08728

(51) Int. Cl.
*H04N 1/46* (2006.01)
*H04N 1/04* (2006.01)

(52) U.S. Cl. ........ 358/514; 358/512; 358/513; 358/505; 358/450; 358/474; 358/483; 358/482; 358/496; 358/497

(58) Field of Classification Search ............ 358/514, 358/512, 513, 483, 482, 450, 496, 498, 497, 358/494, 505, 474; 250/208.1; 359/639, 359/618, 489.07

See application file for complete search history.

(56) References Cited

U.S. PATENT DOCUMENTS

| | | | | |
|---|---|---|---|---|
| 5,414,534 A | * | 5/1995 | Bindon | 358/483 |
| 5,453,611 A | * | 9/1995 | Oozu et al. | 250/208.1 |
| 5,786,901 A | * | 7/1998 | Okada et al. | 358/474 |
| 6,580,528 B1 | * | 6/2003 | Imoto et al. | 358/497 |
| 2009/0040568 A1 | * | 2/2009 | Okada et al. | 358/483 |
| 2010/0231929 A1 | * | 9/2010 | Kakigi | 358/1.2 |

FOREIGN PATENT DOCUMENTS

| | | |
|---|---|---|
| DE | 19835348 | 2/2000 |
| EP | 0302230 | 2/1989 |
| EP | 0932296 | 7/1999 |
| EP | 1528814 | 5/2005 |
| JP | 2001 111774 | 4/2001 |

* cited by examiner

*Primary Examiner* — Cheukfan Lee
(74) *Attorney, Agent, or Firm* — Gerald E. Helget; Briggs and Morgan, P.A.

(57) ABSTRACT

The invention relates to a sheet-fed scanner (300) comprising:
an illumination device for emitting a luminous flux covering several spectral bands which is intended to illuminate a sheet (204) to be scanned,
a focussing device (150), and
a detection module (360) comprising a sensor (164) which comprises a plurality of rows (166, 168, 170) of sensitive elements, each sensitive element being provided to deliver an electrical energy that is proportional to the intensity of the luminous flux received, and each row being provided to have its sensitivity peak for one of said spectral bands,
the focussing device being provided to focus, onto each of the rows, part of the luminous flux reflected by said sheet,
the sheet-fed scanner (300) being characterised in that the detection module (360) comprises a non-prismatic spectral shift device (305) for shifting each part of the luminous flux thus focussed, parallel to said rows (166, 168, 170), the shift being different for each row (166, 168, 170).

15 Claims, 4 Drawing Sheets

SCANNER THAT SCANS TO FILM

The present invention relates to a sheet-fed scanner and to a detection module provided for functioning in such a scanner. The invention finds application in the field of high-resolution document digitisation.

Figure 1:
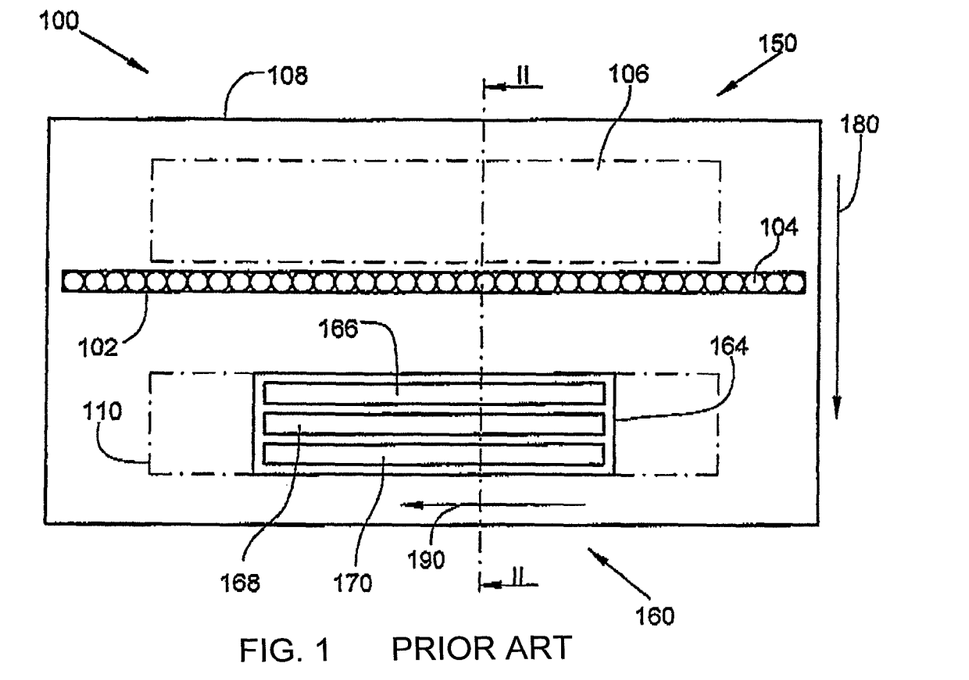
FIG. 1 shows a plan view of a sheet-fed scanner of the prior art.
Figure 2:
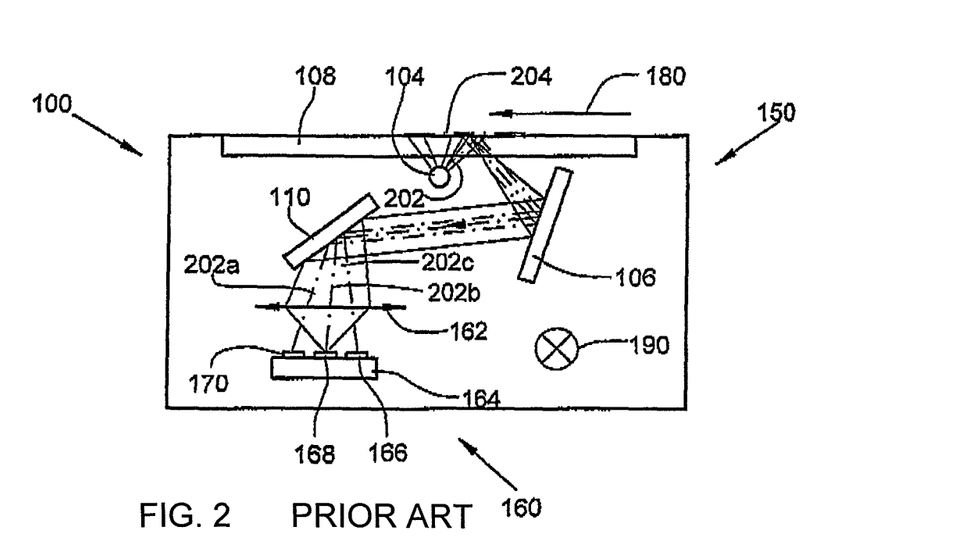
FIG. 2 shows a section through the sheet-fed scanner along the line II-II in FIG. 1.

FIG. 1 shows a plan view of a sheet-fed scanner 100 of the prior art, and FIG. 2 shows a section through the sheet-fed scanner 100 along the line II-II in FIG. 1.

Because of difficulties in showing the various elements which make up a sheet-fed scanner, the paths of the light beams in the various figures do not necessarily respect geometric optics laws. Each light beam substantially takes the shape of a succession of cones, and the path of the luminous flux is shown more particularly by the path of its middle ray.

A sheet-fed scanner 100 of the prior art comprises a pane of glass 108 over which a sheet 204 travels, an illumination device 102, a focussing device 150 and an optical sensing device or detection module 160.

The sheet 204 is pressed against the pane of glass by pressure means of the roller type and is entrained in the direction of the arrow 180 by said pressure means. Elements are printed in grey levels or in colour on the sheet 204, which elements may or may not be arranged on a uniform background.

The illumination device 102 consists of a strip of light-emitting diodes 104. The illumination device 102 emits a luminous flux 202 of white light which passes through the pane of glass 108 so as to illuminate the sheet 204 to be scanned and which is reflected and diffused by the sheet 204.

The optical sensing device or detection module 160 comprises a sensor such as a CCD sensor 164 ("Charge Coupled Device"), CMOS ("Complementary Metal Oxide Semiconductor") or the like. The CCD sensor 164 consists of three rows 166, 168 and 170, each consisting of a plurality of sensitive elements which each deliver an electrical energy that is proportional to the intensity of the luminous flux that it receives. Each row 166, 168, 170 is sensitive in a spectral band that is different from the two others, this being referred to as the spectral band of analysis of the row, each spectral band being centred around a specific wavelength $\lambda_1$, $\lambda_2$, $\lambda_3$, these wavelengths constituting the sensitivity peak of each row. The three rows 166, 168 and 170 are arranged parallel to an axis 190. Each sensitive element of one of the rows is aligned with a sensitive element of each of the two other rows, so that these three sensitive elements thus aligned form a column.

The focussing device 150 is provided for forming the image of a line of the sheet 204 on the optical sensing device or detection module 160, and in particular for focussing, on each of the rows 166, 168, 170, part of the luminous flux reflected by said sheet 204 by forming the image of three parallel lines of the sheet 204 on these three rows 166, 168 and 170.

According to one particular embodiment, the illumination device 102 emits a luminous flux 202, the spectrum of which covers said three spectral bands of analysis of the rows 166, 168 and 170.

In particular, in the case of the CCD sensor referenced TCD2701C from Toshiba, these wavelengths are around 645 nm, 545 nm and 435 nm and, by convention, these wavelengths will be $\lambda_1=643.8$ nm, $\lambda_2=546.1$ nm and $\lambda_3=435.8$ nm. These wavelength values correspond to the reference wavelengths for which the characteristics of the optical materials (particularly the refractive index) are known, given that the errors introduced by these approximations are completely negligible and have no effect on the functioning of the present invention.

During the displacement of the sheet 204, each line is illuminated by the incident luminous flux 202 and its image is successively focussed on the three rows 166, 168 and 170 of the CCD sensor 164. Thus, the complete reading of a line is offset over time since it is necessary to wait until the image of said line has passed to each of the rows 166, 168 and 170. Thus, each line of the sheet 204 is successively analysed by three sensitive elements which each have a different spectral sensitivity but are aligned on the same column.

In particular, the illumination device 102 illuminates the sheet with the incident luminous flux 202 and the focussing system 150 forms the image, in each of said bands of analysis, of three different lines of the sheet 204 on each of the three rows 166, 168 and 170, this focussing being represented, for each of these spectral bands, by their middle rays 202a, 202b and 202c. Each row 166, 168, 170 is thus provided to receive one of the fluxes 202a, 202b and 202c.

To this end, the focussing device 150 comprises for example a first mirror 106, a second mirror 110 and a lens 162. Each secondary flux 202a, 202b, 202c is reflected at the sheet 204, then at the first mirror 106, then at the second mirror 110 and then passes through the lens 162 in order to be focussed towards the optical sensing device or detection module 160. This representation is one possible configuration, but others may exist (for example, it is possible to replace the lens 162 by using mirrors 106 and 110 which have a refractive power and which make it possible to carry out this focussing function).

The various elements making up the sheet-fed scanner 100 are adjusted so that one secondary flux 202a, 202b, 202c is focussed onto each of the rows 166, 168 and 170.

A sheet-fed scanner 100 has a high image acquisition speed in terms of acquiring the image of the sheet 204 due to the fact that no element of the sheet-fed scanner 100 can move. It is therefore not necessary to reinitialise the sheet-fed scanner 100 between two consecutive sheets 204. This is contrary to a flat-bed scanner which requires the placement of the sheet onto the pane of glass and then the displacement of the focussing device and of the optical sensing device or detection module and finally the withdrawal of the sheet and the repositioning of the focussing device and of the optical sensing device or detection module.

Some applications require a high resolution which is difficult to find on sheet-fed scanners of the prior art, unless a very expensive sheet-fed scanner is used. For example, in the case of a systematic digitisation of biometric data sheets (fingerprints, iris scans, etc.), it is beneficial for the digitised image to be as precise as possible and to conform geometrically as best as possible to the scanned image (minimisation of distortion), for the cost of the scanners used to be as low as possible, and for the document processing speed to be as fast as possible, the aim being to process a maximum number of documents in the minimum possible time and space, and at a cost that is as low as possible. This is possible with existing scanners known to date, although their resolution can be improved by a typical factor of two to three.

In order to increase the resolution of such a sheet-fed scanner 100 in the direction of displacement 180 of the sheet, it is possible to modify the speed of travel of the sheet 204 by modifying the speed of rotation of the motor which entrains the sheet 204 via the pressure means. For example, instead of advancing the sheet each time by a value equivalent to the size of one sensitive element, it is possible to advance it by only half this value, which makes it possible to detect twice the number of data on each page. An increase in resolution is thus achieved by means of oversampling.

Because of the direction of displacement of the sheet 204, this method of increasing the resolution cannot be applied in the direction orthogonal to the direction of displacement 180 of the sheet 204. In order to increase the resolution of a sheet-fed scanner 100 in the direction orthogonal to the direction of displacement 180 of the sheet 204, various solutions have been proposed. First, it is possible to turn the axis of the sensor 164 with respect to the direction of travel, but this leads, for the desired gains, to a loss that is too considerable and therefore not acceptable in the useful zone that is scanned, due to the large angle of rotation that is necessary. Other, more evolved methods have been proposed. Mention may be made for example of the use of CCD sensors with a particular geometry, as described in the document U.S. Pat. No. 6,046,772. Mention may also be made of the document US-A-2003/0193567 which discloses a scanning method which requires the displacement of the sheet or of the CCD sensor. The document JP-A-59-174085 discloses a method of increasing the resolution by causing the CCD sensor to vibrate.

These different solutions must be taken into account at the start of designing the scanner and are difficult to adapt to a sheet-fed scanner that is already in existence. In particular, these solutions require either significant modifications to the elements making up the sheet-fed scanner 100, which is expensive, or the installation of moving elements which increases the time taken to scan a sheet 204, these moving elements having to be displaced in order to analyse each line of the sheet 104.

In particular, the document DE-A-198 35 348 discloses a scanner in which the CCD sensor is modified, representing a significant excess cost by comparison with a scanner that has not been modified.

The document EP-A-1 528 814 discloses a video image capture device which provides for increasing the resolution by using a prism. The installation of a prism substantially modifies the direction of propagation of the beams by an order of magnitude greater than the spectral separation effect thereof. This therefore brings about a significant modification to the architecture of the capture device, the sensor no longer being parallel to the focussing lens.

The secondary effect brought about by this non-parallelism/perpendicularity is that it introduces a geometric distortion between the image to be captured and the result obtained, which goes against the desired result of obtaining a high-resolution digital image which is true to the image to be captured.

One object of the present invention is to propose a sheet-fed scanner in which the resolution in the direction orthogonal to the direction of displacement of the sheet is increased and which does not have the drawbacks of the prior art and which, in particular, makes it possible to increase the resolution of a sheet-fed scanner in the direction orthogonal to the direction of displacement of the sheet at low cost and without increasing the time required to scan said sheet.

To this end, there is proposed a sheet-fed scanner comprising:
- an illumination device for emitting a luminous flux covering several spectral bands which is intended to illuminate a sheet to be scanned,
- a focussing device, and
- a detection module comprising a sensor which comprises a plurality of rows of sensitive elements, each sensitive element being provided to deliver an electrical energy that is proportional to the intensity of the luminous flux received, and each row being provided to have its sensitivity peak for one of said spectral bands,
- the focussing device being provided to focus, onto each of the rows, part of the luminous flux reflected by said sheet,
- the sheet-fed scanner being such that the detection module comprises a non-prismatic spectral shift device for shifting each part of the luminous flux thus focussed, parallel to said rows, the shift being different for each row.

Advantageously, the sensor comprises three rows and, relative to the first shifted flux, the second shifted flux is shifted by approximately one-third of a sensitive element and the third shifted flux is shifted by approximately two-thirds of a sensitive element.

Advantageously, the sheet-fed scanner comprises a bandpass filter for said spectral bands.

According to a first particular embodiment, the spectral shift device consists of an optical wave plate which is inclined with respect to the plane of the sensor.

According to another particular embodiment, the spectral shift device consists of an optical wave plate, on one of the faces of which a succession of microgrooves with a prismatic cross section is formed, the axis of which is oriented perpendicular to the desired direction of deviation, these being referred to as "microprisms" throughout the rest of the document.

Advantageously, the other face of the optical wave plate carrying the succession of microprisms is in contact with the sensor.

Advantageously, each microprism is arranged above an integer number of sensitive elements and only above entire sensitive elements.

According to another particular embodiment, the spectral shift device consists of a diffractive element placed at a distance from the sensor.

The invention also proposes a detection module comprising:
- a sensor which comprises a plurality of rows of sensitive elements, each row being provided to receive a luminous flux, and
- a non-prismatic spectral shift device for shifting each flux parallel to said rows, the shift being different for each row.

According to one particular embodiment, the spectral shift device consists of an optical wave plate which is inclined with respect to the plane of the sensor.

According to another particular embodiment, the spectral shift device consists of an optical wave plate, on one of the faces of which a succession of microprisms is formed.

Advantageously, the other face of the optical wave plate carrying the succession of microprisms is in contact with the sensor.

Advantageously, each microprism is arranged above an integer number of sensitive elements and only above entire sensitive elements.

According to another particular embodiment, the spectral shift device consists of a diffractive element placed at a distance from the sensor.

The abovementioned features of the invention, along with others, will become more clearly apparent on reading the following description of an example of embodiment, said description being given with reference to the appended drawings, in which.

The elements of the invention which are identical to the elements from the prior art bear the same references.

Figure 3:
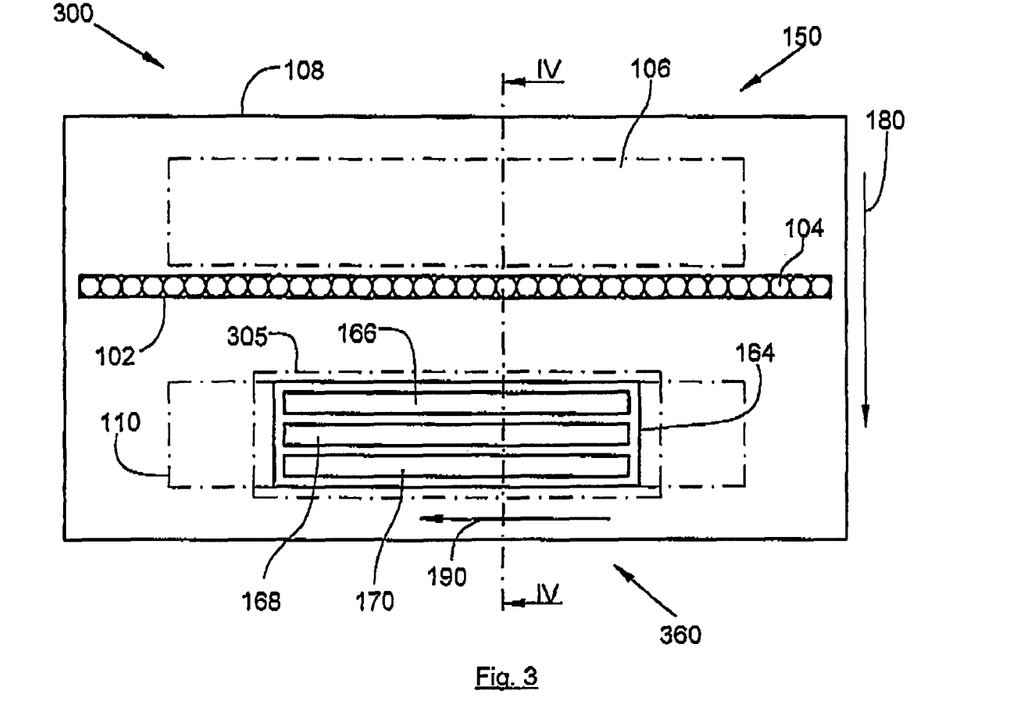
FIG. 3 shows a plan view of a sheet-fed scanner according to the invention.

FIG. 3 is a plan view of a sheet-fed scanner 300 according to the invention which comprises a pane of glass 108 over which a sheet 204 travels, an illumination device 102, a focussing device 150 and an optical shift device or detection module 360.

Besides the elements already described for the sheet-fed scanner of the prior art, the sheet-fed scanner 300 of the invention and, in particular, the optical shift device or detection module 360 comprises a non-prismatic spectral shift device 305 which is provided for shifting each part of the focussed flux, parallel to the rows 166, 168, 170, the shift $\delta_1$, $\delta_2$ being different for each part of the focussed flux, that is to say for each row 166, 168, 170.

The sheet-fed scanner 300 thus comprises:
the illumination device 102 for emitting a luminous flux covering several spectral bands $\lambda_1$, $\lambda_2$, $\lambda_3$ which is intended to illuminate the sheet 204 to be scanned,
the focussing device 150, and
the optical shift device or detection module 360 comprising the sensor 164 which comprises the plurality of rows 166, 168, 170 of sensitive elements, each sensitive element being provided to deliver an electrical energy that is proportional to the intensity of the luminous flux received, and each row being provided to have its sensitivity peak for one of said spectral bands,
the focussing device being provided to focus, onto each of the rows, part of the luminous flux reflected by said sheet.

The sheet-fed scanner 300 is such that the optical shift device or detection module 360 comprises the non-prismatic spectral shift device 305 which is provided for shifting each part of the luminous flux thus focussed, parallel to said rows 166, 168, 170, the shift $\delta_1$, $\delta_2$ being different for each row 166, 168, 170.

By convention, the shift $\delta_1$, $\delta_2$ of a flux is counted positively in the direction of the axis 190 and negatively in the opposite direction, that is to say that the shift $\delta_1$, $\delta_2$ of a flux is counted positively when this flux is displaced in the direction of the axis 190 and negatively when this flux is displaced in the opposite direction. Two shifts $\delta_1$, $\delta_2$ are different if they are of opposite sign or if, when they are of the same sign, the values of their absolute amplitudes are different. The aim is to shift the various luminous fluxes with respect to one another in such a way that none of them are aligned with any of the others.

Figure 4:
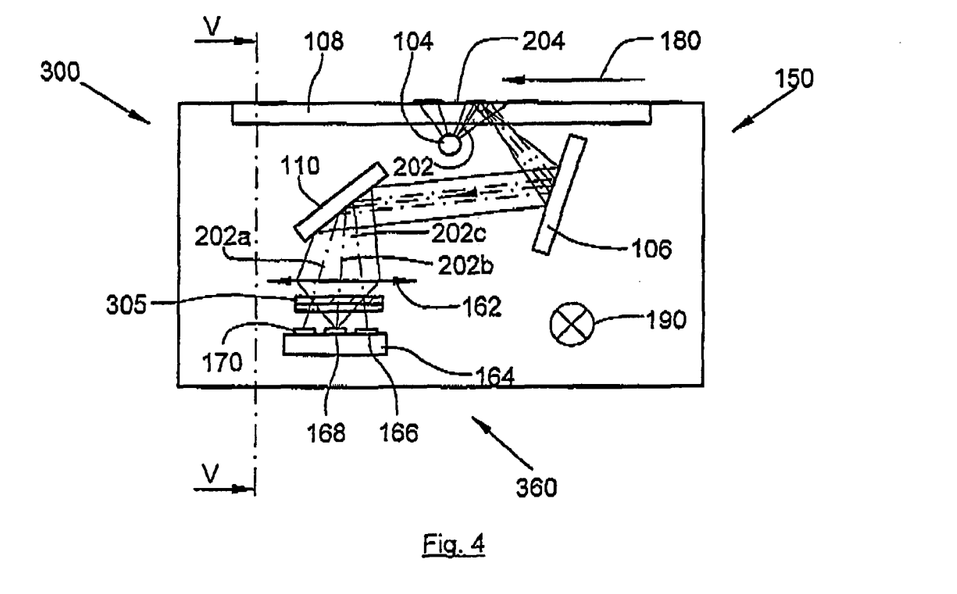
FIG. 4 shows a section through the sheet-fed scanner along the line IV-IV in FIG. 3.
Figure 5:
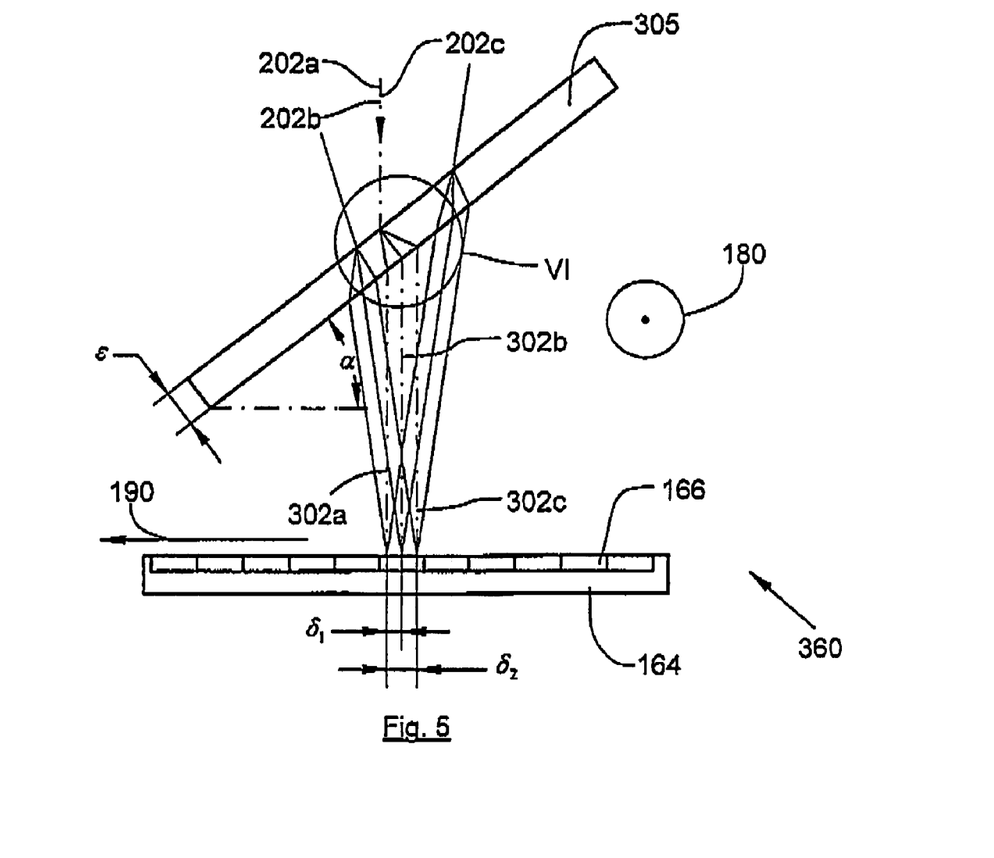
FIG. 5 shows a section along the line V-V in FIG. 4 and an enlarged view of a detection module according to a first embodiment of the invention.

According to a first embodiment of the invention, the spectral shift device 305 is in the form of an inclined optical wave plate of thickness $\epsilon$, as can best be seen in FIG. 5 which is a section through the optical shift device 360 along the line V-V in FIG. 4.

Figure 7:
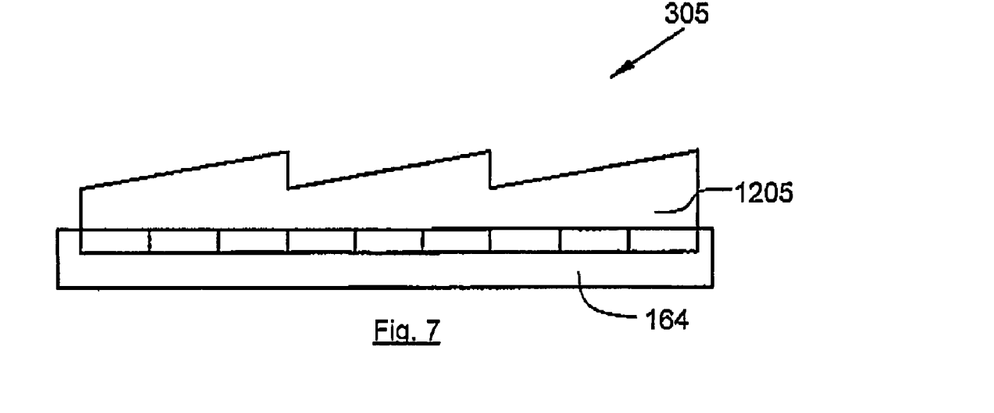
FIG. 7 shows a detection module according to a second embodiment of the invention.

According to a second embodiment of the invention, the spectral shift device 305 is in the form of an optical wave plate 705, on one of the faces of which a succession of microgrooves with a prismatic cross section is formed, the axis of which is oriented perpendicular to the desired direction of deviation, these being known as "microprisms", as can best be seen in FIG. 7.

The spectral shift device 305 may be made of glass or of a plastics material. Mention may be made for example of the following materials BK7, SF11, Plexiglas, polycarbonate or others, as long as the selected material has the desired characteristics: transparency in the operating spectrum of the sensor 164, "optical" quality of the material, suitable chromatic dispersion.

As can best be seen in FIG. 4, the spectral shift device 305 is placed between the lens 162 and the CCD sensor 164. The secondary fluxes 202a, 202b and 202c pass through the spectral shift device 305 before being focussed onto the CCD sensor 164. The spectral shift device 305 is placed as close as possible to the CCD sensor in order to limit the aberrations produced.

The optical shift device or detection module 360 thus comprises the CCD sensor 164 and the spectral shift device 305.

Due to the introduction of the spectral shift device 305, the focussing of each secondary flux 202a, 202b, 202c onto the corresponding row 166, 168, 170 may be disrupted. Suitable adjustment of the focussing device 150 and of the optical shift device 360 makes it possible to re-establish the correct focussing of each secondary flux 202a, 202b, 202c onto the corresponding row 166, 168, 170. This adjustment has to be performed just once for each sheet-fed scanner 300 thus modified and is carried out in the same way as that which is carried out, in the case of a sheet-fed scanner 100 of the prior art, in order to adjust the focussing of each secondary flux 202a, 202b, 202c onto the corresponding row 166, 168, 170.

Furthermore, the time required to scan a sheet 204 is identical to the time required for a sheet-fed scanner 100 of the prior art, since no moving element has been introduced into the sheet-fed scanner 100 of the invention.

In the case of the first embodiment of the invention, the optical wave plate 305 is inclined at an angle $\alpha$ with respect to the horizontal, that is to say with respect to the plane of the CCD sensor 164.

Each secondary flux 202a, 202b, 202c passes through the optical wave plate 305 and emerges therefrom in the form of a shifted secondary flux respectively referenced 302a, 302b, 302c. This is because the inclination of the optical wave plate 305 and the fact that each secondary beam 202a, 202b, 202c consists of different wavelengths, on account of geometric optics laws, give rise to the appearance of a shift between the shifted secondary fluxes 302a, 302b and 302c. The shift is continuous as a function of the wavelength, and it is the mean position of the image, corresponding to the spectral band in question, which is shown here.

Thus, for one line of the sheet 204, the first shifted secondary flux 302a is focussed onto the row 166 and, after a first displacement of the sheet 204, the second shifted secondary flux 302b is focussed onto the row 168 with a shift $\delta_1$ relative to the first shifted secondary flux 302a, namely in the direction orthogonal to the direction of displacement 180 of the sheet 204, that is to say parallel to the orientation of the rows 166, 168 and 170 of sensitive elements of the CCD sensor 164.

For the same line of the sheet 204 and after a second displacement of the sheet 204, the third shifted secondary flux 302c is focussed onto the row 170 with a shift 62 relative to the first shifted secondary flux 302a, namely in the direction orthogonal to the direction of displacement 180 of the sheet 204.

Advantageously, the shift $\delta_1$, $(\delta_2-\delta_1)$ between two consecutive shifted secondary fluxes 302a-302b, 302b-302c is substantially equal to one-third of the dimension of one sensitive element in the shift direction, that is to say to one-third of the dimension of the pixel of the CCD sensor 164 parallel to the axis 190.

As will be explained below, the shift of each secondary flux 202a, 202b, 202c makes it possible to increase the resolution in the direction orthogonal to the direction of displacement 180 of the sheet 204.

Figure 6:
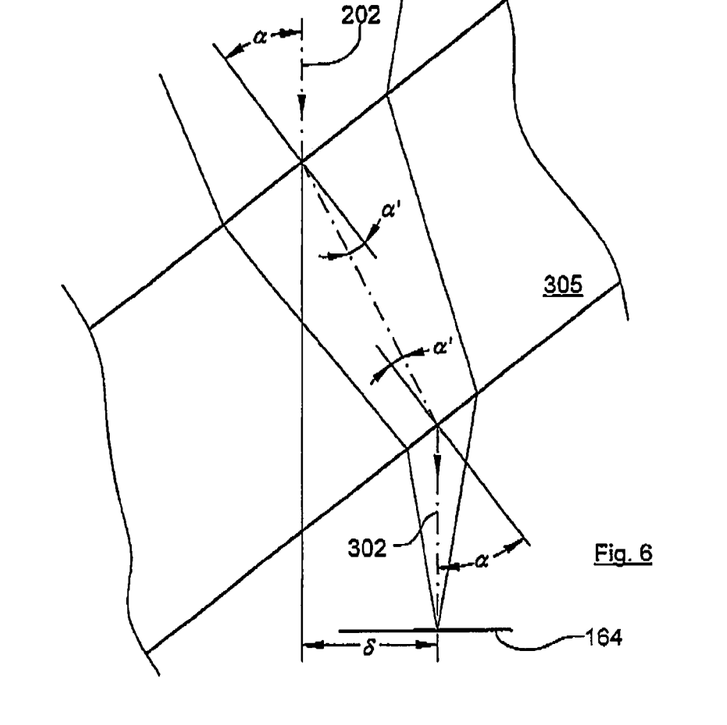
FIG. 6 shows an enlarged view of the zone VI from FIG. 5.

FIG. 6 makes it possible to calculate the shift $\delta$ specific to each wavelength, that is to say between the secondary flux 202 and the corresponding shifted secondary flux 302. The shift $\delta_1$, $(\delta_2-\delta_1)$ between two consecutive shifted secondary fluxes 302a-302b, 302b-302c is then calculated by the difference between the shifts $\delta$ specific to the corresponding wavelengths.

Using geometric optics laws, the following is obtained:

$$\delta = \varepsilon \cdot \frac{\sin(\alpha - \alpha')}{\cos\alpha'}.$$

The angle $\alpha'$ is dependent on the wavelength of the secondary flux 202 and on the material of which the optical wave plate 305 is made.

The wavelength of each secondary flux 202a, 202b, 202c which is taken into account is preferably the one which is centred on the sensitivity peak of the row 166, 168, 170 in question. For example, in the case where the CCD sensor is the sensor referenced TCD2701C from Toshiba, the wavelength of the first secondary flux 202a is centred on the value $\lambda_1=643.8$ nm, the wavelength of the first secondary flux 202b is centred on the value $\lambda_2=546.1$ nm and the wavelength of the third secondary flux 202c is centred on the value $\lambda_3=435.8$ nm.

Numerical application examples are listed in the following table. The numerical values are determined for the selected sensor (in this case the sensor TCD2701C from Toshiba), and are given by way of illustration but must be adapted if a different sensor is selected.

| Material | BK7 | SF11 | Plexiglas | Polycarbonate |
| --- | --- | --- | --- | --- |
| $\varepsilon$ in mm | 10 | 5 | 9 | 5.5 |
| $\alpha$ in degrees | 7 | 5 | 7 | 5.5 |
| $\alpha'$ in rad for $\lambda_1$ | 0.08054 | 0.04906 | 0.08191 | 0.06067 |
| $\alpha'$ in rad for $\lambda_2$ | 0.08033 | 0.04866 | 0.08167 | 0.06031 |
| $\alpha'$ in rad for $\lambda_3$ | 0.07991 | 0.04777 | 0.08119 | 0.05951 |
| $\delta$ in µm for $\lambda_1$ | 417.53 | 191.23 | 363.53 | 194.58 |
| $\delta$ in µm for $\lambda_2$ | 419.65 | 193.22 | 365.61 | 196.56 |
| $\delta$ in µm for $\lambda_3$ | 423.84 | 197.66 | 369.92 | 200.96 |
| $\delta_1$ in µm | −2.12 | −1.99 | −2.08 | −1.97 |
| $(\delta_2 - \delta_1)$ in µm | −4.19 | −4.43 | −4.31 | −4.41 |
| $\delta_2$ in µm | −6.32 | −6.42 | −6.39 | −6.38 |

When using a CCD sensor in which each sensitive element has a size of 9.325 µm by 9.325 µm, such as for example the CCD sensor referenced TCD2701C from Toshiba, the shift $\delta_1$ corresponds substantially to one-third of 9.325 µm (i.e.: 3.108 µm) in the direction opposite the axis 190, and the shift $\delta_2$ corresponds substantially to two-thirds of 9.325 µm (i.e.: 6.217 µm) in the direction opposite the axis 190.

In order to obtain a shift of one-third of a pixel, it is preferable if the shift $\delta_1$ is close to 3.1 µm and if the shift $\delta_2$ is close to 6.2 µm. However, even if the shifts $\delta_1$ and $\delta_2$ are far removed from these values, the invention can function as long as the shifts are significant relative to the dimensions of the sensitive elements.

The method for determining the physical characteristics of the optical wave plate 305 can be broken down into:
- a step of determining each wavelength $\lambda_1$, $\lambda_2$, $\lambda_3$ corresponding to a sensitivity peak of the CCD sensor 164 that is used,
- a step of selecting a base material for forming the optical wave plate 305,
- a step of calculating each shift $\delta_1$, $\delta_2$ based on the material selected, as a function of the thickness and the inclination of the optical wave plate 305,
- a step of optimising the thickness and the inclination of the optical wave plate 305 so that each shift $\delta_1$, $\delta_2$ converges towards the optimum shift, for example one-third and two-thirds of a pixel.

In order to limit the optical aberrations, it is preferable if the inclination remains less than 10°.

During the optimisation step, shifts $\delta_1$ and $\delta_2$ that are too large can be reduced by reducing the thickness and/or the inclination of the optical wave plate 305, or by choosing a less dispersive material.

Conversely, if the shifts $\delta_1$ and $\delta_2$ are too small, they can be increased by increasing the thickness and/or the inclination of the optical wave plate 305, or by choosing a more dispersive material.

The optical wave plate must be relatively thick for the effect of chromatic dispersion to be sufficient to obtain the desired shift. For the sensor mentioned by way of example, the length of which is around 90 mm, the ratio of the thickness to the length of the wave plate must be greater than one twentieth. In order to minimise the other aberrations caused by the wave plate, this ratio should remain less than one ninth.

In the case of a second embodiment of the invention, the face of the optical wave plate 705 which does not carry the succession of microprisms rests on the CCD sensor 164, that is to say that this face of the optical wave plate 705 is in contact with the sensor 164. Each microprism here has a triangular cross section, one of the sides of which has an angle $\alpha$ with respect to the horizontal, that is to say with respect to the plane of the CCD sensor 164, and another side of which is vertical, that is to say orthogonal to the plane of the sensor 164.

In order to form this optical wave plate equipped with microprisms, it is possible to form it by direct machining of the wave plate, It is also possible to obtain an equivalent result by using a thin microprism plate which is suitably shaped so that it can be glued to a wave plate with parallel faces, by selecting materials with a homogeneous index.

In order to make it easier to analyse the signals received from the CCD sensor 164, it is preferable if each vertical side of the microprisms is aligned with the boundary between two sensitive elements. In other words, each microprism must be arranged above an integer number of sensitive elements and only above entire sensitive elements.

In the same way as for the first embodiment of the invention, each secondary flux 202a, 202b, 202c passes through the microprisms and the optical wave plate 705 and emerges therefrom in the form of a shifted secondary flux which will activate the sensitive elements of the CCD sensor 164.

In the same way as for the first embodiment, the first shifted secondary flux and the second shifted secondary flux are shifted by $\delta_1$, and the third shifted secondary flux and the first shifted secondary flux are shifted by $\delta_2$.

Figure 8:
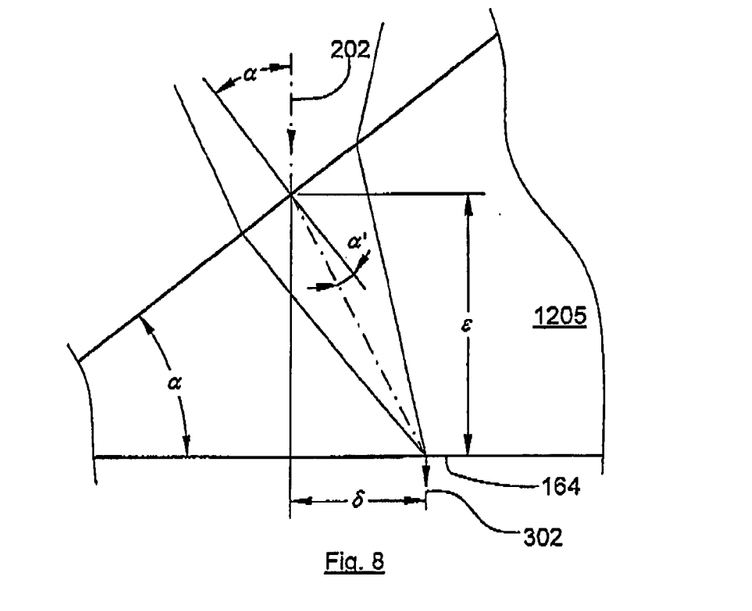
FIG. 8 is a view equivalent to that of FIG. 6, for the detection module according to the second embodiment of the invention.

FIG. 8 makes it possible to calculate the shift $\delta$ specific to each wavelength, that is to say between the secondary flux 202 and the corresponding shifted secondary flux 302. The shift $\delta_1$, $(\delta_2-\delta_1)$ between two consecutive shifted secondary fluxes is then calculated by the difference between the shifts $\delta$ specific to the corresponding wavelengths.

Using geometric optics laws, the following is obtained:

$$\delta = \epsilon \cdot \tan(\alpha - \alpha').$$

Numerical application examples for the same wavelengths as above are listed in the following table:

| Material | BK7 | SF11 | Plexiglas | Polycarbonate |
|---|---|---|---|---|
| $\epsilon$ in mm | 10 | 5 | 9 | 5.5 |
| $\alpha$ in degrees | 7 | 5 | 7 | 5.5 |
| $\alpha'$ in rad for $\lambda_1$ | 0.08054 | 0.04906 | 0.08191 | 0.06067 |
| $\alpha'$ in rad for $\lambda_2$ | 0.08033 | 0.04866 | 0.08167 | 0.06031 |
| $\alpha'$ in rad for $\lambda_3$ | 0.07991 | 0.04777 | 0.08119 | 0.05951 |
| $\delta$ in µm for $\lambda_1$ | 416.5337 | 191.1411 | 362.6083 | 194.3457 |
| $\delta$ in µm for $\lambda_2$ | 418.6634 | 193.1386 | 364.6889 | 196.3233 |
| $\delta$ in µm for $\lambda_3$ | 422.8682 | 197.5849 | 369.0105 | 200.7394 |
| $\delta_1$ in µm | −2.13 | −2.00 | −2.08 | −1.98 |
| $(\delta_2 - \delta_1)$ in µm | −4.20 | −4.45 | −4.32 | −4.42 |
| $\delta_2$ in µm | −6.33 | −6.44 | −6.40 | −6.39 |

The method for determining the physical characteristics of the microprisms and of the optical wave plate 705 is the same as that described for the first embodiment, apart from the fact that the inclination is no longer the inclination of the optical wave plate but rather the angle of each microprism.

Regardless of whether it is for the first embodiment or for the second embodiment of the invention, each scanned line of the sheet 204 is broken down into three secondary fluxes 202a, 202b, 202c which are each shifted in the form of a shifted secondary flux 302a, 302b, 302c. Each shifted secondary flux 302a, 302b, 302c will excite the sensitive elements of one of the rows 166, 168, 170 of the CCD sensor 164.

The image of the scanned line of the sheet 204 will thus be formed successively on each row 166, 168, 170 in a manner shifted by approximately one-third of a pixel on each of these rows 166, 168, 170.

Then, after recording these three primary images of the sheet, these images can then be recombined by calculating the characteristics of sub-pixels, having a size smaller than that of the pixels of the sensor (typically 3 sub-pixels per pixel in the example described, these sub-pixels having a size equal to one-third of a pixel) so as to obtain the desired increase in resolution. These methods are known to the person skilled in the art. Mention may be made for example of the patents JP2002199248, EP1079330 or EP1226508 with regard to the geometry of each calculated sub-pixel, or to the patents EP0221111 or EP1157538 when considering the colour aspect of the calculated sub-pixel.

The shift of the shifted secondary fluxes 302a, 302b, 302c therefore makes it possible to increase the resolution of the sheet-fed scanner 300 in the direction orthogonal to the direction of displacement 180 of the sheet 204. The installation of the non-prismatic spectral shift device 305 can be easily carried out on a sheet-fed scanner of the prior art, that is to say that the increase in resolution of the sheet-fed scanner 100 of the prior art is easily achieved by adding the non-prismatic spectral shift device 305, and this makes it possible to obtain a sheet-fed scanner with a high resolution at a low cost.

The installation of the non-prismatic spectral shift device 305 makes it possible to increase the resolution of the sheet-fed scanner 300 without causing any distortion or optical aberrations that are disruptive since they go against the desired effect of increasing the desired resolution by causing a noticeable degradation in the quality of the images formed, as would occur in the case of using a convergent-ray prism (that is to say between the focussing lens and the sensor).

The resolution here is multiplied by 3 because of the shift by one-third of a pixel. This value can be obtained by modifying the physical characteristics of the shift device 162, 1462, such as for example its dimensions, its material, its inclination, etc. The optimisation of the result is thus obtained when, relative to the first shifted flux 302a, the second shifted flux 302b is shifted by approximately one-third of a sensitive element and the third shifted flux 302c is shifted by approximately two-thirds of a sensitive element, that is to say respectively one-third of a pixel and two-thirds of a pixel.

The method of approximation may, for example, assign to each new sensitive sub-element a value generated from the colour averaged between the value recorded by the corresponding sensitive element and that of the neighbouring sensitive elements, optionally weighted by the mean of the three components so as to take account of the chromatic value of the scanned elements relative to the rest of the image. Mention may be made, for example, of the patent application EP-A-1 524 625 which presents a method for increasing the resolution of an image.

Of course, the present invention is not limited to the examples and embodiments described and shown here, but rather it is susceptible to numerous variants accessible to the person skilled in the art.

For example, the spectral shift device may take the form of a diffractive element, for example a diffraction grating. This must be arranged a certain distance away from the CCD sensor so that the deviation which is generated for each flux, and which is proportional to this distance, makes it possible to create a shift close to the desired shift.

The mirrors may be mirrors with a refractive power, and the installation of the lens is then no longer necessary.

In order to reduce the aberrations introduced by the spectral shift device, a band-pass filter for said spectral bands (in this case 3 bands) may be installed on the optical path upstream of the sensor, this filter then making it possible to limit the luminous flux around the sensitivity peaks of the sensor and to improve the images produced in each spectral band by limiting the chromatic aberrations of the device.

The invention has been more particularly described in the case of a sensor comprising three rows of sensitive elements, but it applies in the same way to any sensor comprising at least two rows. Preferably, the shift generated between two consecutive rows by the spectral shift device is close to the ratio of the width of one sensitive element to the number of rows. For example, the sensor may have four rows, three of which are dedicated to colours and one of which is dedicated to grey levels; the shift is then preferably equal to one-quarter of the width of a sensitive element. For example, the sensor may have two rows, one being dedicated to the visible spectrum and the other to the infrared spectrum; the shift is then preferably equal to half the width of a sensitive element.

The invention claimed is:
1. A sheet-fed scanner (300) comprising:
an illumination device (102) for emitting a luminous flux covering several spectral bands ($\lambda_1$, $\lambda_2$, $\lambda_3$) which is intended to illuminate a sheet (204) to be scanned,
a focussing device (150), and
a detection module (360) comprising a sensor (164) which comprises a plurality of rows (166, 168, 170) of sensitive elements, each sensitive element being provided to deliver an electrical energy that is proportional to the intensity of the luminous flux received, and each row being provided to have its sensitivity peak for one of said spectral bands, the focussing device being provided to focus, onto each of the rows, part of the luminous flux reflected by said sheet, the sheet-fed scanner (300) being characterised in that the detection module (360) comprises a non-prismatic spectral shift device (305, 705) for shifting each part of the luminous flux thus focussed, parallel to said rows (166, 168, 170), the shift ($\delta_1, \delta_2$) being different for each row (166, 168, 170).

2. The sheet-fed scanner (300) of claim 1, wherein the shift generated between two consecutive rows by the spectral shift device (305, 1205) is close to the ratio of the width of one sensitive element to the number of rows (166, 168, 170).

3. The sheet-fed scanner (300) of claim 1, wherein the sensor comprises three rows (166, 168, 170) and, relative to the first shifted flux (302*a*), the second shifted flux (302*b*) is shifted by approximately one-third of a sensitive element and the third shifted flux (302*c*) is shifted by approximately two-thirds of a sensitive element.

4. The sheet-fed scanner (300) of claim 1, characterised in that it comprises a band-pass filter for said spectral bands.

5. The sheet-fed scanner (300) of claim 1, wherein the spectral shift device consists of an optical wave plate (305) which is inclined ($\alpha$) with respect to the plane of the sensor (164).

6. The sheet-fed scanner (300) of claim 1, wherein the spectral shift device consists of an optical wave plate (705), on one of the faces of which a succession of microprisms is formed.

7. The sheet-fed scanner (300) of claim 6, wherein the other face of the optical wave plate (705) carrying the succession of microprisms is in contact with the sensor (164).

8. The sheet-fed scanner (300) of claim 6, wherein each microprism is arranged above an integer number of sensitive elements and only above entire sensitive elements.

9. The sheet-fed scanner (300) of claim 1, wherein the spectral shift device consists of a diffractive element placed at a distance from the sensor (164).

10. A detection module (360) comprising:
a sensor (164) which comprises a plurality of rows (166, 168, 170) of sensitive elements, each row (166, 168, 170) being provided to receive a luminous flux, and
a non-prismatic spectral shift device (305, 705) for shifting each flux parallel to said rows (166, 168, 170), the shift ($\delta_1, \delta_2$) being different for each row (166, 168, 170).

11. The detection module (360) of claim 10, wherein the spectral shift device consists of an optical wave plate (305) which is inclined ($\alpha$) with respect to the plane of the sensor (164).

12. The detection module (360) of claim 10, wherein the spectral shift device consists of an optical wave plate (705), on one of the faces of which a succession of microprisms is formed.

13. The detection module (360) of claim 12, wherein the other face of the optical wave plate carrying the succession of microprisms is in contact with the sensor (164).

14. The detection module (360) of claim 12, wherein each microprism is arranged above an integer number of sensitive elements and only above entire sensitive elements.

15. The detection module (360) of claim 10, wherein the spectral shift device consists of a diffractive element placed at a distance from the sensor (164).

* * * * *

UNITED STATES PATENT AND TRADEMARK OFFICE
CERTIFICATE OF CORRECTION

PATENT NO. : 8,149,481 B2
APPLICATION NO. : 11/906834
DATED : April 3, 2012
INVENTOR(S) : Dufresne de Virel Page 1 of 1

It is certified that error appears in the above-identified patent and that said Letters Patent is hereby corrected as shown below:

Title Page,

Item (12), delete "Dufresne du Virel" and insert --Dufresne de Virel-- therefor.

Item (75), delete "Francois Dufresne du Virel" and insert --Francois Dufresne de Virel-- therefor.

In the Specifications:

Column 6, line 64, delete "62" and insert --$\delta_2$-- therefor.

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,149,481 B2 | Page 1 of 1 |
| APPLICATION NO. | : 11/906834 | |
| DATED | : April 3, 2012 | |
| INVENTOR(S) | : Dufresne de Virel | |

It is certified that error appears in the above-identified patent and that said Letters Patent is hereby corrected as shown below:

On the Title Page

Item (73), Assignee: delete "Sagem Securite, Paris (FR)" and insert --Morpho, Paris (FR)-- therefor.

Signed and Sealed this
Twentieth Day of November, 2012

David J. Kappos
*Director of the United States Patent and Trademark Office*